United States Patent Office 3,366,510
Patented Jan. 30, 1968

3,366,510
PROCESS FOR THE MANUFACTURE OF NIO-
BATES AND TANTALATES OF ALKALI MET-
ALS AND ALKALINE EARTH METALS AND
COATING OBJECTS THEREWITH
Gustav Daendliker, Birsfelden, Switzerland, assignor to
Ciba Limited, Basel, Switzerland, a Swiss company
No Drawing. Filed June 24, 1964, Ser. No. 377,470
Claims priority, application Switzerland, June 28, 1963,
8,080/63
16 Claims. (Cl. 117—169)

ABSTRACT OF THE DISCLOSURE

A process for manufacturing niobates and tantalates of alkali metals and alkaline earth metals is provided wherein an alcoholate or phenolate of niobium or tantalum is reacted with a hydroxide, alcoholate or phenolate of an alkali metal or alkaline earth metal in an anhydrous solution. The resulting adduct is decomposed by hydrolysis or pyrolysis into the corresponding niobate or tantalate of the alkali or alkaline earth metal.

---

It is known that niobates and tantalates can be manufactured by fusing a suitable heavy-metal oxide, for example niobium pentoxide, with the oxide of the desired cation or with a compound thereof that can be converted by pyrolysis into the oxide, for example sodium oxide or sodium carbonate. This process has a number of disadvantages. As a result of the high temperatures required only such niobates and tantalates can be produced as are stable at these temperatures. Furthermore, there is a risk of a premature volatilization of the reactants, especially of the alkali metal oxides. Owing to the difference in volatilization speeds it is also difficult to use two different alkali metal oxides concurrently.

The present invention provides a process for the manufacture of niobates and tantalates of alkali metals and alkaline earth metals, wherein an alcoholate or phenolate of niobium or tantalum is reacted with hydroxide, alcoholate or phenolate of an alkali or alkaline earth metal, preferably at the molecular ratio of 1:1, in an anhydrous solution and the resulting adduct is converted by hydrolysis or pyrolysis into the corresponding niobate or tantalate of the alkali or alkaline earth metal concerned.

The alcoholates of niobium and tantalum and of the alkali and alkaline earth metals are derived, in the first place, from methanol or ethanol; likewise suitable are higher alcohols such as n-butanol. Particularly suitable alkali metals are potassium, sodium and lithium and preferred alkaline earth metals are magnesium, calcium, strontium and barium.

The hydroxides, alcoholates and phenolates of the alkali and alkaline earth metals and the alcoholates and phenolates of niobium and tantalum used as starting materials can be manufactured in the known manner.

The intermediately formed adducts are obtained by mixing preferably 1 mol of a hydroxide, alcoholate or phenolate of an alkali or alkaline earth metal with preferably 1 mol of an alcoholate or phenolate of niobium or tantalum in solution. Preferred use is made of the alcoholates and phenolates of the alkali or alkaline earth metals. The resulting adduct is the corresponding double alcoholate or double phenolate. Instead of the alkali or alkaline earth metal alcoholates or phenolates there may be used with equal success the corresponding anhydrous hydroxides. The reaction is carried out in an anhydrous solution, viz. in liquid medium in the absence of water, preferably in the presence of an organic solvent. A solvent preferably used for the manufacture of the adducts is an alcohol, for example methanol or ethanol.

The resulting adduct can be converted into the niobate or tantalate respectively by hydrolysis, preferably with addition of ammonia, followed by calcination at 400° to 700° C., or by pyrolysis at a temperature from 400° to 700° C. If the adduct is converted by hydrolysis into the niobate or tantalate, it may be subjected to the hydrolysis directly, without first having been isolated from the reaction mixture.

The process of the invention has the advantage that it is not difficult to maintain stoichiometric proportions and that the metallate is otbained as an extremely fine powder. A further important advantage of the new process is that it is possible to maufacture homogeneous and dense metallate coats. The object to be coated, such as metals, silica gel or kieselguhr, can be coated by dipping in or brushing with a solution of an adduct, whereupon the coated object is dried and the desired coating can be produced by simple hydrolysis or pyrolysis.

The present process is suitable not only for the manufacture of uniform niobates and tantalates but also of such as contain two or more alkali metals in the exactly desired ratio, for example $KNa(NbO_3)_2$. Furthermore, it is possible to prepare not only meta-niobates and meta-tantalates (that is to say compounds obtained when the starting materials are used at a molecular ratio of 1:1) but also metallates having a different molecular ratio. For example, there may be obtained metallates from 1 mol of alcoholate or phenolate of niobium or tantalum with 2 to 10 mols of the alkali or alkaline earth metal compound, or in which the proportions are reversed.

Unless otherwise indicated, parts and percentages in the following examples are by weight.

Example 1

6 parts of sodium were slowly dissolved in 150 parts of ethanol and 64 parts of niobium ethylate of the formula $Nb(OC_2H_5)_5$ were added. After a short time the double alcoholate of the probable formula $NaNb(OC_2H_5)_6$ began to crystallize out. In a first fraction there were obtained 57.5 parts of a white crystalline powder.

The product thus obtained was divided into two portions. One half was kept for 24 hours in an atmosphere saturated with steam, then dried for 15 hours at 150° C. and thereupon heated for 4 hours at 400° C.

The remainder was once more dissolved in ethanol, stirred with a small amount of concentrated ammonia and rapidly diluted with much distilled water. The resulting precipitate was filtered off, washed with distilled water, dried and then heated for 4 hours at 400° C. Both products were snow white and revealed identical Debye-Scherrer diagrams of a cubic lattice.

The analysis revealed the following niobium contents:

| | Percent |
|---|---|
| 1st portion | 56.2 |
| 2nd portion | 56.1 |
| $NaNbO_3$ (theoretical) | 56.7 |

Example 2

A solution of 6.9 g. of NaOH in a mixture of 50 ml. of methanol and 50 ml. of ethanol was slowly dropped into an ammonia-saturated solution of 55 g. of niobium ethylate in 100 ml. of absolute alcohol. The resulting mixture—which contained sodium and niobium in molecular proportions—remained clear even after having been kept for days.

On addition of 15 ml. of water, together with a further 100 ml. of alcohol at 50° C., a quantitative precipitate formed which was filtered off. On concentration of the filtrate, a residue of only about 0.1 g. remained.

The precipitate was dried at 150° C. and then calcined at 600° C. Analysis revealed a niobium content of 56.3%

(theory: 56.7% for $NaNbO_3$). The crystal lattice was pseudocubic with superstructure lines.

Example 3

Molecular proportions of tantalum ethylate (41.1 parts) and potassium hydroxide (5.6 parts) were reacted as described in Example 2. In this case, too, the soluble residue obtained by precipitation and filtration was small (0.1 part).

The white crystalline powder displayed a tetragonal indicatable crystal structure.

Tantalum content.—Found: 67.3%. Calculated: 67.5% for $KTaO_3$.

Example 4

4 g. of sodium were dissolved in 140 ml. of absolute ethanol and 40 g. of tantalum ethylate were added with heating. The double alcoholate could be caused to crystallize out by cooling. The white crystalline mass was filtered under nitrogen, washed with a small amount of cold ethanol and dried; it melted at about 53° C. The yield from the first crystallization was 28 g. Further fractions became available on concentrating the filtrate.

The double alcoholate was redissolved in 200 ml. of alcohol and hydrolysed by vigorously stirring in concentrated ammonia. The resulting precipitate was filtered, dried and calcined for 4 hours at 400° C.

The white product still lost 2.9% on calcination. The tantalum content, substracting the calcination loss, was 87.7% (theory: 87.6% for $NaTaO_3$). The Debye-Scherrer diagram displayed only the lines that characterise $NaTaO_3$ (ASTM file index).

Example 5

(a) *Lithium tantalate.*—A round-bottom flask equipped with reflux condenser was charged under nitrogen with 96 g. of tantalum ethylate and 300 ml. of anhydrous ethanol, and 1.64 g. of lithium were dissolved in this batch. While hot, the solution remained as clear as water. When this solution was allowed to cool, the double alcoholate of lithium and tantalum separated in handsomely formed, long prisms which were filtered off under nitrogen and dried. The yield amounted to 38 g.

One part of this double alcoholate was hydrolysed by being allowed to stand in air and then calcined for 2 hours at 700° C. The resulting fine, insoluble white powder contained 76.3% of tantalum (theory: for $LiTaO_3$ 76.7%). The product was identified as the lithium meta-tantalate.

The product produced an X-ray diagram such as has not yet been described and which suggests a probable orthorhombic lattice.

The filtrate obtained on isolation of the double alcoholate, in which the bulk of the double alcoholate was still dissolved, was poured into a shallow dish and allowed to dry in air. The resulting gelatinous crust was collected in a platinum dish, dried at 100° C. and then calcined for 2 hours at 700° C. The analysis and X-ray diagram of the resulting white product revealed that it was identical with the lithium meta-tantalate described above.

(b) *Coatings from lithium meta-tantalate.*—50 ml. of the double-alcoholate solution produced as described under (a) were diluted with ethanol to 200 ml. Square pieces of sheet silver (10 x 10 x 0.1 mm.; with a piece of silver wire soldered on to enable the silver squares to be handled) were dipped into the solution under dry nitrogen, then withdrawn, the excess solution was allowed to drip off and the squares were dried under nitrogen. This operation was repeated three times. In the case of bright sheets the presence of the thin coat of double alcoholate formed was revealed by interference colours. The squares were then kept for several hours in a humid atmosphere and finally calcined for 4 hours at 600° C.

The X-ray analysis of these coats from lithium tantalate revealed the same crystal structure as was observed with the preparations according to (a). An analogous experiment with aluminum sheet squares yielded the identical result.

Example 6

(a) An apparatus as described in Example 5 was charged with 34.3 g. of niobium ethylate in 300 ml. of anhydrous ethanol. While heating this batch, 2.62 g. of magnesium chips were dissolved in it. A glass-clear solution formed which was divided into two parts. One part was poured over an aluminum foil with turned-up edges and allowed to dry. The dry crust was then collected and calcined in a platinum dish for 4 hours at 600° C. The analysis of the white material revealed a content of equal proportions of niobium and magnesium.

(b) The remainder of the above solution was diluted with alcohol to double the volume and used for the production of coats on sheet silver as described in Example 5. The coated squares were dried in a dry atmosphere for 4 hours at 600° C. The powder obtained as described under (a) and the covering coat formed revealed identical X-ray diagrams.

Example 7

A solution of 15.6 g. of tantalum phenolate in 200 ml. of methanol and 20 ml. of toluene was prepared in an apparatus as described in Example 5; 168 mg. of lithium were added and the whole was allowed to react. The resulting clear solution was allowed to dry in a large dish and the dried residue was calcined for 4 hours at 600° C. The analysis of the material revealed a tantalum content of 76.4% (theory: for $LiTaO_3$ 76.7%). The X-ray diagram was identical with that of the product described in Example 5.

What is claimed is:

1. A process for the production of metallates selected from the group consisting of an alkali metal niobate, alkali metal tantalate, alkaline earth metal niobate and alkaline earth metal tantalate, said process comprising reading an alcoholate having 1–4 carbon atoms of a metal selected from the group consisting of niobium and tantalum under anhydrous conditions with a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, and decomposing the resulting reaction product into the corresponding metallate.

2. A process for the production of metallates selected from the group consisting of an alkali metal niobate, alkali metal tantalate, alkaline earth metal niobate and alkaline earth metal tantalate, said process comprising reacting a phenolate selected from the group consisting of niobium and tantalum under anhydrous conditions with a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, and thereafter decomposing the resulting reaction product into the corresponding metallate.

3. A process for the production of metallates selected from the group consisting of an alkali metal niobate, alkali metal tantalate, alkaline earth metal niobate and alkaline earth metal tantalate, said process comprising reacting one mol of an alcoholate having 1–4 carbon atoms of a metal selected from the group consisting of niobium and tantalum under anhydrous conditions with one mol of a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, and decomposing the resulting reaction product into the corresponding metallate.

4. A process for the production of metallates selected from the group consisting of an alkali metal niobate, alkali metal tantalate, alkaline earth metal niobate and alkaline earth metal tantalate, said process comprising reacting one mol of a phenolate selected from the group consisting of niobium and tantalum under anhydrous conditions with one mol of a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, and decomposing the resulting reaction product into the corresponding metallate.

5. A process for the production of an alkali metal niobate said process comprising reacting an alkali metal alcoholate having 1–4 carbon atoms under anhydrous conditions with a niobium alcoholate having 1–4 carbon atoms, separating the reaction product and pyrolyzing it at temperatures ranging from 400–700° C.

6. A process for the production of an alkali metal niobate said process comprising reacting an alkali metal hydroxide under anhydrous conditions with a niobium alcoholate having 1–4 carbon atoms, separating the reaction product and pyrolyzing the reaction product at temperatures ranging from 400–700° C.

7. The process according to claim 1 wherein the resulting reaction product is decomposed by pyrolysis at a temperature ranging from about 400–700° C. into the corresponding metallate.

8. The process according to claim 1 wherein the resulting reaction product is decomposed by hydrolysis followed by calcination at a temperature ranging from about 400–700° C. into the corresponding metallate.

9. The process according to claim 2 wherein the resulting reaction product is decomposed by pyrolysis at a temperature ranging from about 400–700° C. into the corresponding metallate.

10. The process according to claim 2 wherein the resulting reaction product is decomposed by hydrolysis followed by calcination at a temperature ranging from about 400–700° C. into the corresponding metallate.

11. The process according to claim 3 wherein the resulting reaction product is decomposed by pyrolysis at a temperature ranging from about 400–700° C. into the corresponding metallate.

12. The process according to claim 3 wherein the resulting reaction product is decomposed by hydrolysis followed by calcination at a temperature ranging from about 400–700° C. into the corresponding metallate.

13. The process according to claim 4 wherein the resulting reaction product is decomposed by pyrolysis at a temperature ranging from about 400–700° C. into the corresponding metallate.

14. The process according to claim 4 wherein the resulting reaction product is decomposed by hydrolysis followed by calcination at a temperature ranging from about 400–700° C. into the corresponding metallate.

15. A process for coating an object with a metallate selected from the group consisting of an alkali metal niobate, alkali metal tantalate, alkaline earth metal niobate and alkaline earth metal tantalate, said process comprising raecting an alcoholate having 1–4 carbon atoms of a metal selected from the group consisting of niobium and tantalum under anhydrous conditions with a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, applying the resulting reaction product to the surface of the object to be coated and decomposing the reaction product into the corresponding metallate.

16. A process for coating an object with a metallate selected from the group consisting of an alkali metal niobate, alkali metal tantalate, alkaline earth metal niobate and alkaline earth metal tantalate, said process comprising reacting a phenolate of a metal selected from the group consisting of niobium and tantalum under anhydrous conditions with a compound selected from the group consisting of an alkali metal hydroxide, alkali metal alcoholate having 1–4 carbon atoms, alkali metal phenolate, alkaline earth metal hydroxide, alkaline earth metal alcoholate having 1–4 carbon atoms and alkaline earth metal phenolate, applying the resulting reaction product to the surface of the object to be coated and decomposing the reaction product into the corresponding metallate.

References Cited

UNITED STATES PATENTS 3,065,049  11/1962  Bundy _____ 23—51
3,292,994  12/1966  Kiss et al. _____ 23—51

OTHER REFERENCES

Roth: "Journal of Research of the National Bureau of Standards," vol. 58, February 1957, pp. 75–88 (p. 75 of particular interest).

Wainer et al.: "Journal of the American Ceramic Soc.," vol. 35, August 1952, pp. 207–214 (pp. 207–209 of particular interest).

OSCAR R. VERTIZ, *Primary Examiner.*

H. T. CARTER, *Assistant Examiner.*

UNITED STATES PATENT OFFICE
CERTIFICATE OF CORRECTION

Patent No. 3,366,510                          January 30, 1968

Gustav Daendliker

It is certified that error appears in the above identified patent and that said Letters Patent are hereby corrected as shown below:

Column 4, line 37, "reading" should read -- reacting --.
Column 6, line 9, "raecting" should read -- reacting --.

Signed and sealed this 20th day of January 1970.

(SEAL)
Attest:

Edward M. Fletcher, Jr.                      WILLIAM E. SCHUYLER, JR.
Attesting Officer                               Commissioner of Patents